United States Patent
Noguchi et al.

(10) Patent No.: US 6,483,988 B1
(45) Date of Patent: Nov. 19, 2002

(54) AUDIO AND VIDEO SIGNALS RECORDING APPARATUS HAVING SIGNAL FORMAT DETECTING FUNCTION

(75) Inventors: Tadashi Noguchi, Tokorozawa (JP); Hidehiro Ishii, Tokorozawa (JP); Toshiro Tanikawa, Tokorozawa (JP)

(73) Assignee: Pioneer Corporation, Tokyo (JP)

(*) Notice: Subject to any disclaimer, the term of this patent is extended or adjusted under 35 U.S.C. 154(b) by 0 days.

(21) Appl. No.: 09/421,250

(22) Filed: Oct. 20, 1999

(30) Foreign Application Priority Data

Oct. 21, 1998 (JP) .......................................... 10-299697

(51) Int. Cl.[7] .............................................. H04N 5/91
(52) U.S. Cl. ...................... 386/96; 386/104; 386/105; 960/61; 960/69
(58) Field of Search ..................... 386/33, 39, 96–98, 386/99, 101, 104–106, 111–112; 704/225, 201, 500; 709/100; 360/69, 72.2, 73.2, 61; 381/94.5, 119, 123

(56) References Cited

U.S. PATENT DOCUMENTS

| | | | | | |
|---|---|---|---|---|---|
| 4,982,305 A | * | 1/1991 | Asano et al. | ............... | 360/72.2 |
| 6,240,388 B1 | * | 5/2001 | Fukuchi | ...................... | 704/225 |
| 6,311,204 B1 | * | 10/2001 | Mills | .......................... | 709/100 |
| 6,339,756 B1 | * | 1/2002 | Hinderks | .................... | 704/201 |
| 6,356,211 B1 | * | 3/2002 | Shimoyoshi et al. | ........ | 704/500 |

* cited by examiner

Primary Examiner—Thai Tran
Assistant Examiner—Christophedr Onuaku
(74) Attorney, Agent, or Firm—Morgan, Lewis & Bockius LLP

(57) ABSTRACT

A recording apparatus capable of recording an audio signal on a recording medium without introducing a deterioration in sound quality. When a digital audio signal input to a digital audio input terminal has a predetermined signal form, the digital audio signal is recorded on the recording medium instead of an analog audio signal input to an analog audio input terminal.

6 Claims, 4 Drawing Sheets

AUDIO AND VIDEO SIGNALS RECORDING APPARATUS HAVING SIGNAL FORMAT DETECTING FUNCTION

BACKGROUND OF THE INVENTION

1. Field of the Invention

The present invention relates to a recording apparatus for recording an audio signal and a video signal on a recording medium and reproducing the same therefrom.

2. Description of Related Art

Nowadays, services for delivering digitized programs such as music, sports, dramas and so on have already been brought into practice through utilization of the satellite broadcasting. In homes where such services are received, a dedicated satellite broadcasting receiver is installed for receiving the satellite broadcasting. The satellite broadcasting receiver decodes a signal received by a satellite broadcasting antenna in a desired manner to recover an analog audio signal and a video signal corresponding to a program as mentioned above and to supply these signals to a television receiver.

Thus, for recording such a satellite broadcast program on a digital information recording medium such as CD-R, DVD-R/W, DVD-RAM or the like, analog audio and video signals output from the satellite broadcasting receiver must once be analog-to-digital (A/D) converted to produce a digital version of these signals before they are recorded.

However, since the audio signal is deteriorated in the course of the A/D conversion, a problem arises in that a good sound quality cannot be provided during the reproduction of the audio signal.

OBJECT AND SUMMARY OF THE INVENTION

The present invention has been made to solve the problem as mentioned above, and its object is to provide a recording apparatus which is capable of recording an audio signal on a recording medium without introducing deterioration in sound quality.

The present invention provides a recording apparatus which comprises recording means for analog-to-digital converting an analog audio signal input to an analog audio input terminal to a digital audio signal, and recording the digital audio signal on a recording medium; a digital audio input terminal; and signal form determination means for determining whether or not a digital audio signal input to the digital audio input terminal has a predetermined signal form, wherein the recording means records the digital audio signal input to the digital audio input terminal on the recording medium instead of the digital audio signal converted from the analog audio signal, when the signal form determination means determines that the digital audio signal has the predetermined signal form.

DETAILED DESCRIPTION OF THE PREFERRED EMBODIMENTS

Figure 1:
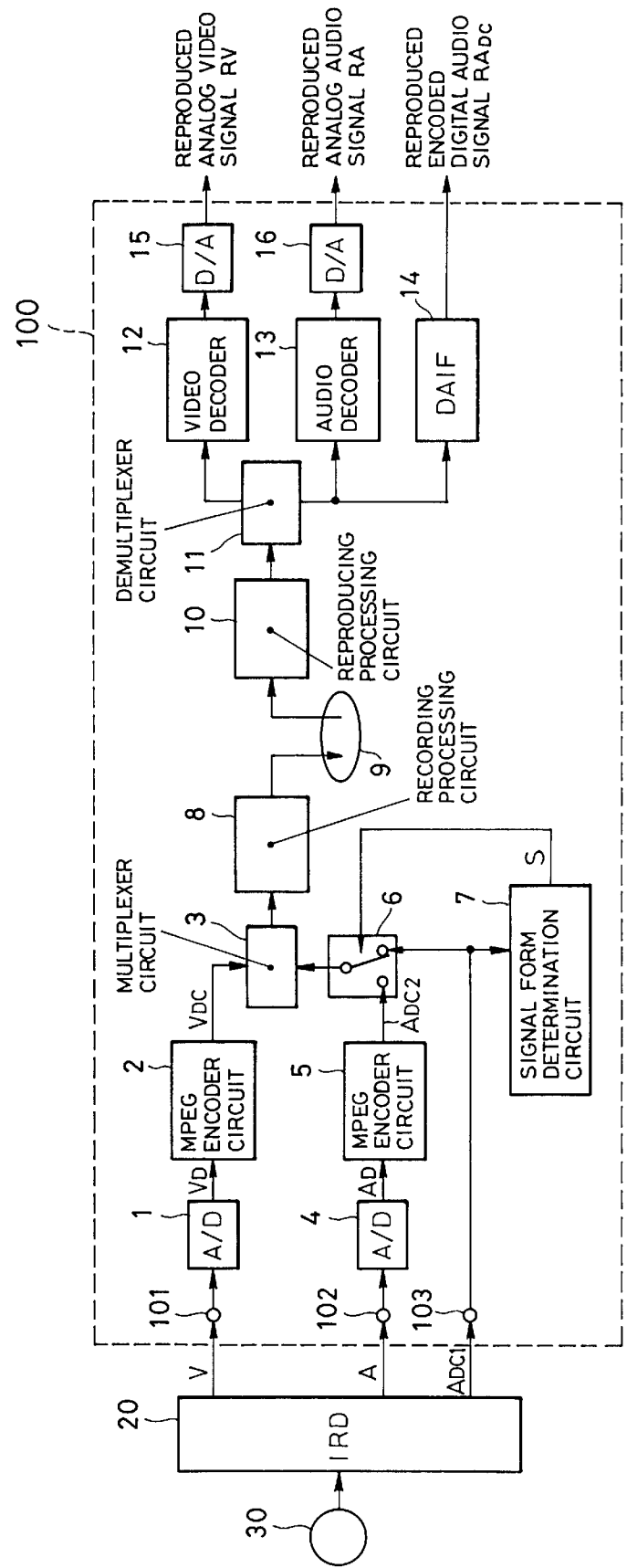
FIG. 1 is a block diagram illustrating the configuration of a DVD-R/W deck as a recording apparatus according to the present invention.

FIG. 1 is a block diagram illustrating the configuration of a DVD-R/W deck as a recording apparatus according to the present invention.

Referring specifically to FIG. 1, an IRD (Integrated Receiver Decoder) 20 serving as a satellite broadcasting receiver receives a desired satellite broadcast wave through an antenna 30. Since a broadcast wave includes a multiplexed form of an encoded digital video signal and an encoded digital audio signal, the IRD 20 first separates it into the encoded digital video signal and the encoded digital audio signal. It should be noted that the foregoing encoded digital video signal and encoded digital audio signal are those signals which are encoded in a provider of the satellite broadcast wave, for example, in accordance with MPEG (Moving Picture Experts Group), Dolby digital (hereinafter referred to as the "AC-3"), or any other suitable encoding scheme. The IRD 20 decodes the separated encoded digital video signal and encoded digital audio signal corresponding to the encoding scheme applied thereto to recover an original digital video signal and digital audio signal. Next, the IRD 20 digital-to-analog (D/A) converts the recovered digital video signal and digital audio signal to produce an analog video signal V and an analog audio signal A which are output and supplied to an analog video input terminal 101 and an analog audio input terminal 102 of a DVD-R/W deck 100, respectively. Further, the IRD 20 supplies an encoded digital audio input terminal 103 of the DVD-R/W deck 100 with the encoded digital audio signal before decoding, as it is, as an encoded digital audio signal $A_{DC1}$. In this way, the IRD 20 supplies the DVD-R/W deck 100 with the audio signals of the same contents as the analog audio signal A and the encoded digital audio signal $A_{DC1}$.

The DVD-R/W deck 100 records the video signal and audio signals input to the input terminals 101–103 on a DVD (Digital Versatile Disc) 9, later described, and reproduces the video signal and audio signal recorded on this DVD 9. The DVD 9 may be a rewritable medium which is a so-called DVD-R/W.

An A/D converter 1 of the DVD-R/W deck 100 A/D converts the analog video signal V input to the analog video input terminal 101 to a digital video signal $V_D$ which is supplied to an MPEG video encoder 2. The MPEG video encoder 2 MPEG encodes the digital video signal $V_D$ to produce an encoded digital video signal $V_{DC}$ which is supplied to a multiplexer circuit 3. An A/D converter 4 A/D converts the analog audio signal A input to the analog audio input terminal 102 to a digital audio signal $A_D$ which is supplied to an MPEG audio encoder 5. The MPEG audio encoder 5 MPEG encodes the digital audio signal $A_D$ to produce an encoded digital audio signal $A_{DC2}$ which is supplied to a selector 6.

A signal form determination circuit 7 determines whether or not the encoded digital audio signal $A_{DC1}$ input to the encoded digital audio input terminal 103 has a signal form which can be decoded in an audio decoder 13 (later described). In this event, the signal form determination circuit 7 supplies the selector 6 with a selection signal S at logical level "1" when it determines that the encoded digital audio signal $A_{DC1}$ has a decodable signal form, and otherwise at logical level "0."

Figure 2:
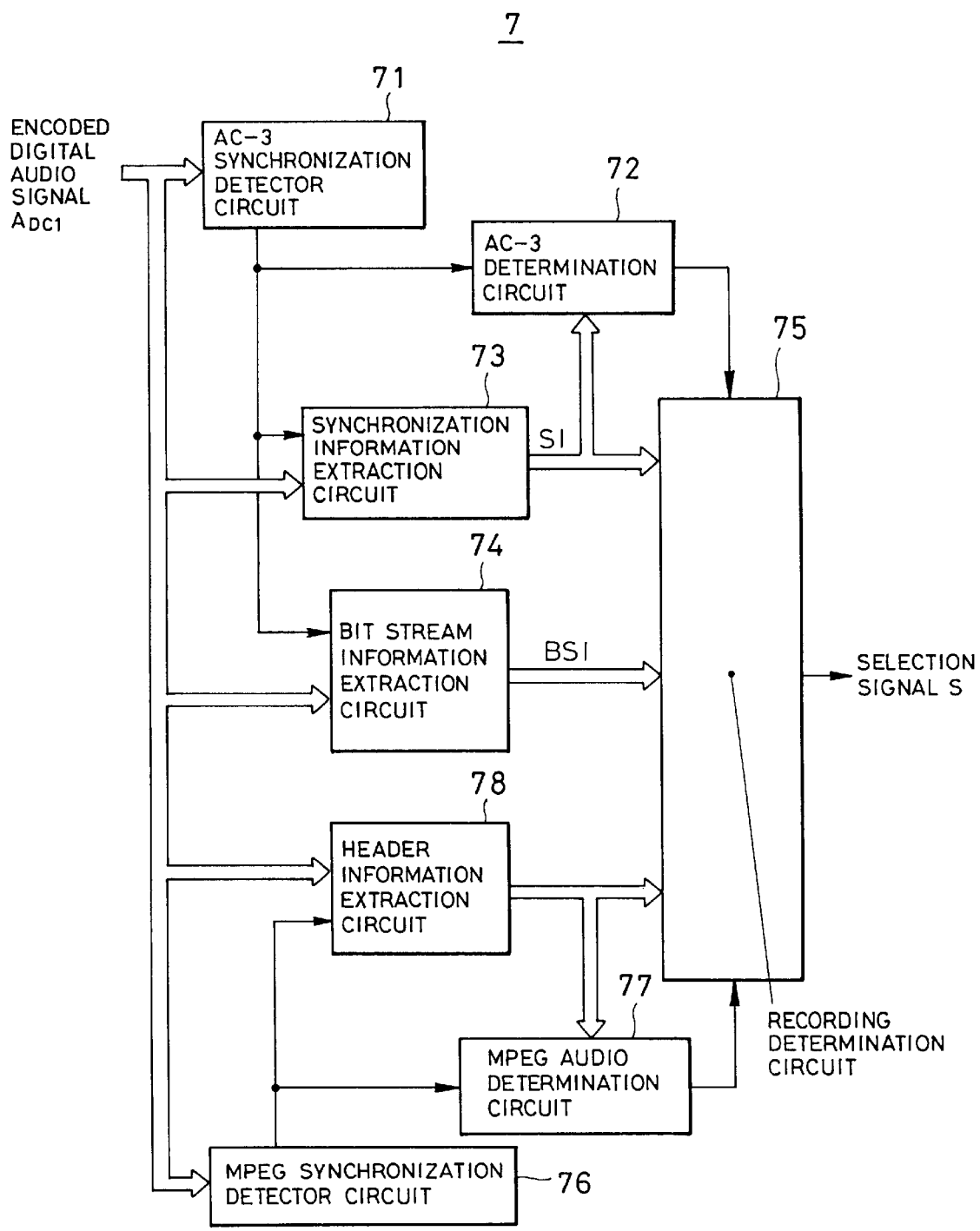
FIG. 2 is a block diagram illustrating the internal configuration of a signal form determination circuit 7.

FIG. 2 is a block diagram illustrating the internal configuration of the signal form determination circuit 7.

Figure 3:
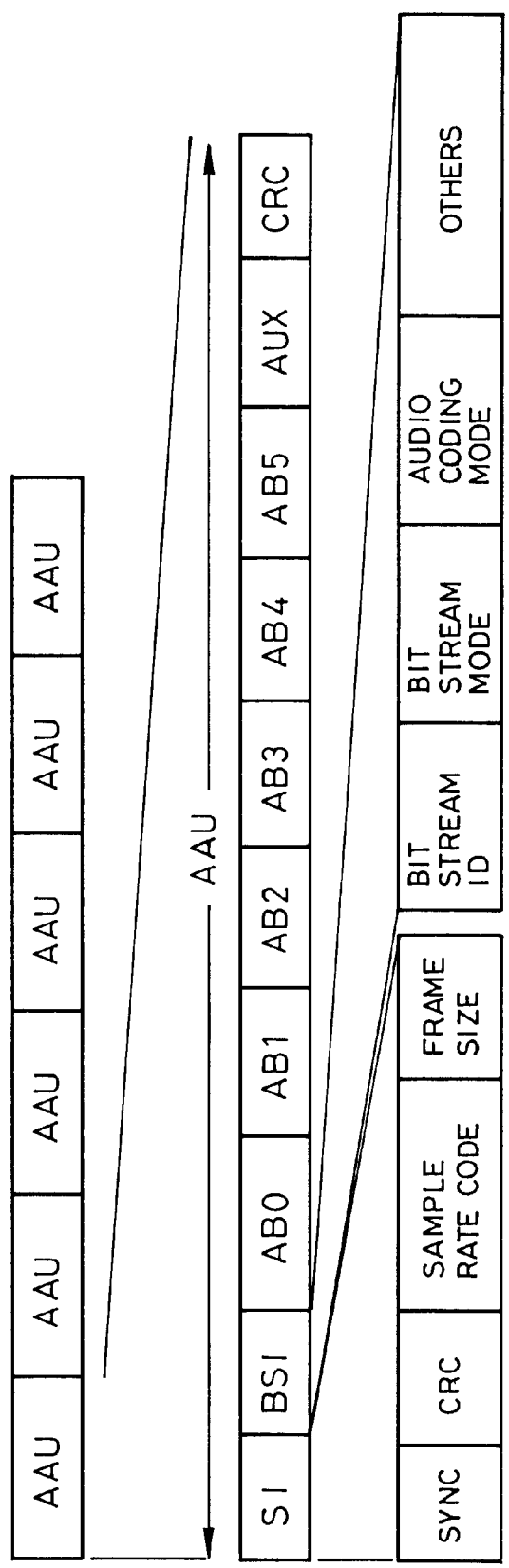
FIG. 3 is a diagram showing an AC-3 signal format.

Referring specifically to FIG. 2, an AC-3 synchronization detector circuit 71 generates a synchronization detection signal each time it detects a synchronization signal from the encoded digital audio signal $A_{DC1}$ input to the encoded digital audio input terminal 103, and supplies the synchronization detection signal to an AC-3 determination circuit 72, a synchronization information extraction circuit 73 and a bit stream information extraction circuit 74, respectively. The synchronization information extraction circuit 73, responsive to the synchronization detection signal, extracts synchronization information SI shown in FIG. 3 from the encoded digital audio signal $A_{DC1}$, and supplies the synchronization information SI to the AC-3 determination circuit 72 and a recording determination circuit 75, respectively. The bit stream information extraction circuit 74, responsive to the synchronization detection signal, extracts bit stream information BSI shown in FIG. 3 from the encoded digital audio signal $A_{DC1}$, and supplies the bit stream information BSI to the recording determination circuit 75. FIG. 3 shows a signal format for AC-3. The AC-3 determination circuit 72 finds a synchronization period of the AC-3 signal based on the synchronization information SI, and determines that the encoded digital audio signal $A_{DC1}$ is an AC-3 signal when the synchronization detection signal is supplied at each period.

When the AC-3 determination circuit 72 determines that the encoded digital audio signal $A_{DC1}$ is an AC-3 signal, the recording determination circuit 75 then determines based on the contents of the synchronization information SI and the bit stream information BSI whether or not the encoded digital audio signal $A_{DC1}$, has a signal form which can be decoded in the audio decoder 13. In this event, the recording determination circuit 75 outputs a selection signal S at logical level "1" when it determines that the encoded digital audio signal $A_{DC1}$, has a decodable signal form, and otherwise at logical level "0." Assuming for example that even though the audio decoder 13, which is an AC-3 signal decoder, determines that the encoded digital audio signal $A_{DC1}$ is an AC-3 signal, if a sampling frequency indicated by the synchronization information SI lies out of a decodable range of the audio decoder 13, the recording determination circuit 75 outputs the selection signal S at logical level "0." In other words, while a plurality of sampling frequencies are provided in the AC-3 standard, some decoders only support part of these sampling frequencies.

The MPEG synchronization detector circuit 76, in turn, generates a synchronization detection signal each time a synchronization signal is detected from the encoded digital audio signal $A_{DC1}$, and supplies the synchronization detection signal to an MPEG audio determination circuit 77 and an MPEG header information extraction circuit 78, respectively. The MPEG header information extraction circuit 78 extracts a header portion of the encoded digital audio signal $A_{DC1}$, and supplies the extracted header information to the MPEG audio determination circuit 77 and the recording determination circuit 75, respectively. The MPEG audio determination circuit 77 finds a synchronization period of an MPEG signal based on the header information, and determines that the encoded digital audio signal $A_{DC1}$ is an MPEG encoded signal when the synchronization detection signal is supplied at each period. Further, the MPEG audio determination circuit 77 determines based on the header information whether or not the encoded digital audio signal $A_{DC1}$ is an MPEG audio signal.

When the MPEG audio determination circuit 77 determines that the encoded digital audio signal $A_{DC1}$ is an MPEG audio signal, the recording determination circuit 75 determines based on the contents of the header information whether or not this encoded digital audio signal $A_{DC1}$, has a signal form which can be decoded in the audio decoder 13. In this event, the recording determination circuit 75 outputs a selection signal S at logical level "1" when it determines that the encoded digital audio signal $A_{DC1}$, has a decodable signal form, and otherwise at "0." Assuming for example that even though the encoded digital audio signal $A_{DC1}$ is determined to be an MPEG encoded signal, if a sampling frequency indicated by the header information, or a mode (stereo, monaural) lies out of a decodable range of the audio decoder 13, the recording determination circuit 75 outputs the selection signal S at logical level "0."

As described above, the signal form determination circuit 7 determines whether or not the encoded digital audio signal $A_{DC1}$ input to the encoded digital audio input terminal 103 has a signal form supported by the MPEG or AC-3 scheme which can be decoded by the audio decoder 13, later described. In this event, the signal form determination circuit 7 supplies the selector 6 with the selection signal S at logical level "1" when a decodable signal form is determined, and otherwise at logical level "0."

The selector 6 selects one of the encoded digital audio signal $A_{DC2}$ supplied from the MPEG audio encoder 5 and the encoded digital audio signal $A_{DC1}$ supplied from the IRD 20, in accordance with the logical level of the selection signal S, and supplies the selected one to the multiplexer circuit 3. Specifically, the selector 6 supplies the multiplexer circuit 3 with the encoded digital audio signal $A_{DC2}$ supplied from the MPEG audio encoder 5 when the selection signal S is at logical level "0," i.e., when the signal form determination circuit 7 determines that the encoded digital audio signal $A_{DC1}$ cannot be decoded in the audio decoder 13. On the other hand, the selector supplies the multiplexer circuit 3 with the encoded digital signal $A_{DC1}$ when the selection signal S is at logical level "1," i.e., when the signal form determination circuit 7 determines that the encoded digital audio signal $A_{DC1}$ can be decoded in the audio decoder 13.

The multiplexer circuit 3 multiplexes the audio signal selected from the selector 6 and the encoded digital video signal $V_{DC}$ supplied from the MPEG video encoder circuit 2 to produce a multiplexed signal which is supplied to a recording processing unit 8. When the audio signal supplied from the selector 6 is the encoded digital audio signal $A_{DC1}$, the multiplexer circuit 3 delays this encoded digital audio signal $A_{DC1}$, by a predetermined time period before multiplexing it with the encoded digital video signal $V_{DC}$. Specifically, since the encoded digital audio signal $A_{DC1}$ must be decoded and D/A converted for audibly outputting the encoded digital audio signal $A_{DC1}$, the IRD 20 previously takes into consideration processing time required therefor by outputting the encoded digital audio signal $A_{DC1}$ at a timing earlier than that of the analog video signal V. Further, in the DVD-R/W deck 100, the analog video signal V is supplied to the multiplexer circuit 3 after A/D conversion and decoding, while the encoded digital audio signal $A_{DC1}$ is directly supplied to the multiplexer circuit 3. In other words, the timing of the video signal becomes earlier with respect to that of the audio signal. Thus, for multiplexing these signals for recording, the multiplexer 3 delays the encoded digital audio signal $A_{DC1}$ by the predetermined time period, and then multiplexes the delayed encoded digital audio signal $A_{DC1}$ with the encoded digital video signal $V_{DC}$ in order to match the timings of both the signals. The recording processing unit 8 applies the multiplexed signal with modulation and error correction coding based on a DVD recording format, and records the thus processed multiplexed signal on the DVD 9 as a recording medium.

The reproduction processing unit 10 reads recorded information from the DVD 9, binaries the thus read signal, applies the binarized read signal with demodulation and error correction based on the DVD recording format to recover the multiplexed signal which is supplied to a demultiplexer circuit 11. The demultiplexer circuit 11 demultiplexes the multiplexed signal into an encoded digital video signal and an encoded digital audio signal. The demultiplexer circuit 11 supplies the demultiplexed encoded digital video signal and encoded digital audio signal to a video decoder 12 and the audio decoder 13, respectively. The video decoder 12 decodes the encoded digital video signal, which has been MPEG encoded, to an original digital video signal which is supplied to a D/A converter 15. The D/A converter 15 D/A converts the digital video signal to an analog video signal which is output as a reproduced analog video signal RV.

The audio decoder 13, which has a function of decoding, for example, both MPEG encoded signals and AC-3 signals, decodes the encoded digital audio signal to an original digital audio signal with the decoding function, and supplies a D/A converter 16 with the original digital audio signal. The D/A converter 16 D/A converts the digital audio signal to produce an analog audio signal which is output as a reproduced analog audio signal RA. Further, the encoded digital audio signal demultiplexed by the demultiplexer circuit 11 is output as a reproduced encoded digital audio signal $RA_{DC}$ through a digital audio interface circuit 14.

Next, description will be made on the operation performed by the foregoing configuration.

The DVD-R/W deck 100, serving as a recording apparatus, is provided with an analog audio input terminal 102 and an encoded digital audio input terminal 103 as an interface for recording an audio signal.

The DVD-R/W deck 100 determines, as to these two audio input terminals, whether or not the encoded digital audio signal $A_{DC1}$ input to the encoded digital audio input terminal 103 has a signal form which can be decoded by the audio decoder 13 (MPEG or AC-3). In this event, when determining that the encoded digital audio signal $A_{DC1}$ has a decodable signal form, the DVD-R/W deck 100 selects the encoded digital audio signal $A_{DC1}$ input to the encoded digital audio input terminal 103, multiplexes the selected signal with the encoded digital video signal $V_{DC}$, and records the multiplexed signal on the DVD 9. On the other hand, when determining that the encoded digital audio signal $A_{DC1}$ does not have a decodable signal form, for example, a signal form in accordance with DTS (digital theater system), the DVD-R/W deck 100 selects the encoded digital audio signal $A_{DC2}$ derived through the A/D converter 4 and the MPEG audio encoder 5 after being input to the analog audio input terminal 102, multiplexes the selected signal with the encoded digital video signal $V_{DC}$, and records the multiplexed signal on the DVD 9. Furthermore, even if the encoded digital audio signal $A_{DC1}$ is MPEG or AC-3 encoded, the analog audio signal A is selected when the sampling frequency, mode (stereo or monaural) or the like exceeds a decodable range of the audio decoder 13. That is, the encoded digital audio signal $A_{DC2}$ produced by encoding the analog audio signal A in the MPEG audio encoder 5 is multiplexed with the encoded digital video signal $V_{DC}$, and recorded on the DVD 9.

In the foregoing embodiment, when it is determined that the encoded digital audio signal $A_{DC1}$ is not decodable, the encoded digital audio signal $A_{DC2}$ produced by encoding the analog audio signal A in the MPEG audio encoder 5 is recorded on the DVD 9 as an audio signal. However, taking into consideration the case where the thus recorded DVD 9 is reproduced by another disc player, even if the encoded digital audio signal $A_{DC1}$ cannot be reproduced in the DVD-R/W deck 100 illustrated in FIG. 1, i.e., even if the encoded digital audio signal $A_{DC1}$ exceeds a decodable range of the audio decoder 13, this signal would rather be recorded. In other words, even if the DVD-R/W deck 100 is not capable of reproducing, the recording of any signal in a form, which can be reproduced by many other disc players, would not hinder the user in reproducing such a signal, but advantageously provide the capability of recording any signal without deterioration in sound quality.

Figure 4:
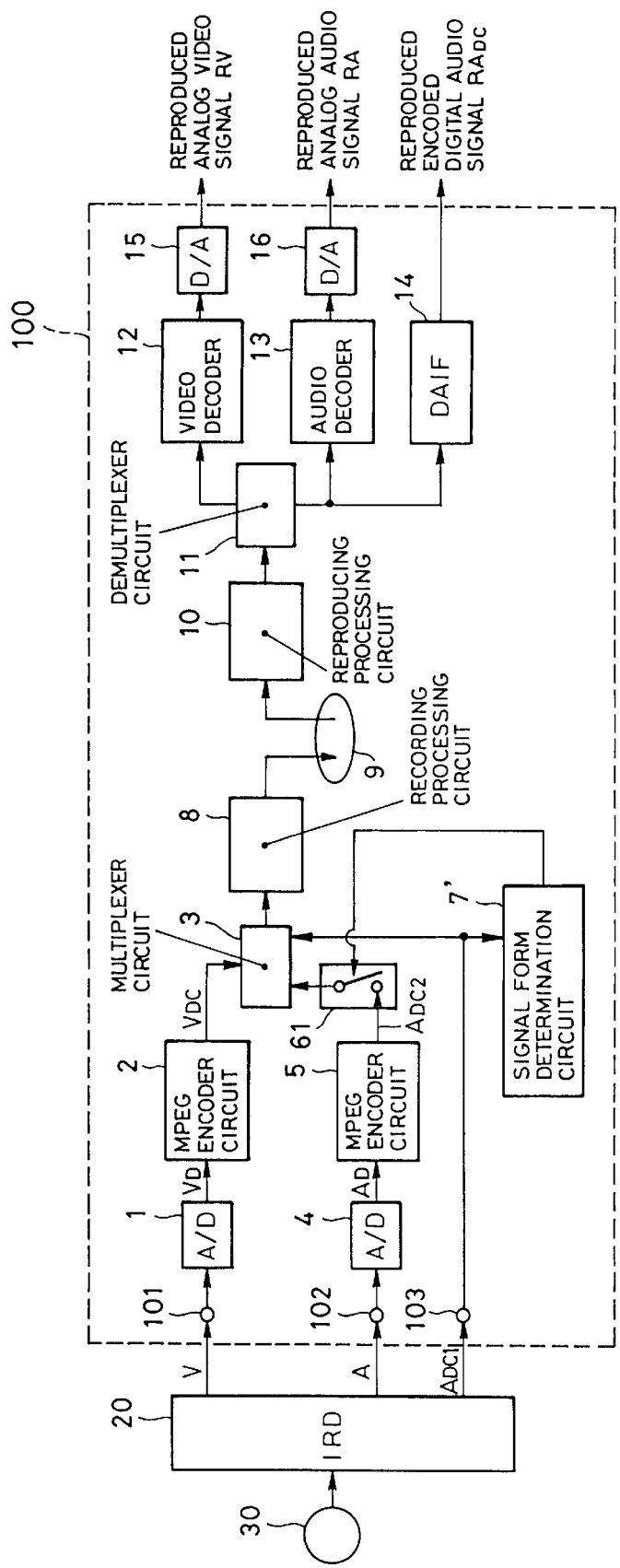
FIG. 4 is a block diagram illustrating the configuration of a DVD-R/W deck according to another embodiment of the present invention.

FIG. 4 is a block diagram illustrating the internal configuration of a DVD-R/W deck 100 according to another embodiment of the present invention which has been made in view of the above discussion.

The configuration illustrated in FIG. 4 differs from that in FIG. 1 in that the selector 6 is replaced by a switch 61, and the signal form determination circuit 7 is replaced by a signal form determination circuit 7' for controlling the switch 61. The rest of the configuration is identical to that of FIG. 1, so that description thereon is omitted.

Referring specifically to FIG. 4, the signal form determination circuit 7' controls the switch 61 to turn on when no encoded digital audio signal $A_{DC1}$ is input to an encoded digital audio input terminal 103. With this control, an analog video signal V input to an analog video input terminal 101 and an analog audio signal A input to an analog audio input terminal 102 are respectively MPEG encoded, multiplexed, and then recorded on a DVD 9.

On the other hand, when an encoded digital audio signal $A_{DC1}$ is input to the encoded digital audio input terminal 103, the signal form determination circuit 7' first determines whether or not this encoded digital audio signal $A_{DC1}$ has a signal format which can be decoded in an audio decoder 13. When determining that the encoded digital audio signal $A_{DC1}$ has a decodable signal form, the signal format determination circuit 7' controls the switch 61 to turn off. With this control, an MPEG encoded version of the analog video signal V input to the analog video signal terminal 101 and the encoded digital audio signal $A_{DC1}$ are multiplexed and recorded on the DVD 9. Conversely, when determining that the encoded digital audio signal $A_{DC1}$ does not have a decodable signal form in the audio decoder 13, the signal form determination control circuit 7' controls the switch 61 to turn on. With this control, MPEG encoded versions of the respective analog video signal V and analog audio signal A and the encoded digital audio signal $A_{DC1}$ are multiplexed and recorded on the DVD 9.

It should be noted that, similarly to the signal form determination circuit 7', the signal form determination circuit 7 shown in FIG. 1 may also have a function of determining whether or not the encoded digital audio signal $A_{DC1}$ has been input to the encoded digital audio input terminal 103. In this event, the signal form determination circuit 7, when determining that the encoded digital audio signal $A_{DC1}$ has not been input, supplies the selector 6 with the selection signal S at logical level "0," as does when the encoded digital audio signal $A_{DC1}$ does not have a decodable signal form.

As described above, the recording apparatus according to the present invention comprises a digital audio input terminal for inputting an encoded digital audio signal in addition to an analog audio input terminal, such that when a digital audio signal of a predetermined signal form is input to the digital audio input terminal, this digital audio signal is preferentially recorded on a recording medium.

Thus, according to the present invention, when an analog audio signal and a digital audio signal of a predetermined signal form are simultaneously input, the digital audio signal is preferentially selected for recording, so that a deterioration in sound quality can be suppressed during reproduction in correspondence to the resulting elimination of A/D conversion during recording.

What is claimed is:

1. A recording apparatus comprising:

recording means for analog-to-digital converting an analog audio signal input to an analog audio input terminal to a digital audio signal, and recording the digital audio signal on a recording medium;

a digital audio input terminal; and signal form determination means for determining whether or not a digital audio signal input to said digital audio input terminal has a predetermined signal form, wherein said recording means records said digital audio signal input to said digital audio input terminal on said recording medium instead of said digital audio signal converted from said analog audio signal, when said signal form determination means determines that said digital audio signal has said predetermined signal form.

2. A recording apparatus according to claim 1, further comprising:

reproducing means for performing audio decoding on a read signal read from said recording medium to produce a reproduced audio signal, wherein said predetermined signal form is a signal form which can be decoded in said audio decoding.

3. A recording apparatus for receiving a video signal input to a video input terminal and an analog audio signal input to an analog audio input terminal, analog-to-digital converting said analog audio signal to a digital audio signal, multiplexing the video signal and the digital audio signal, and recording the multiplexed signal on a recording medium, said recording apparatus comprising:

a digital audio input terminal; and a signal form determination means for determining whether or not a digital audio signal input to said digital audio input terminal has a predetermined signal form, wherein when said signal form determination means determines that said digital audio signal input to said digital audio input terminal has said predetermined signal form, said digital audio signal input to said digital audio input terminal is multiplexed with said video signal, and recorded on said recording medium, instead of the digital audio signal converted from said analog audio signal.

4. A recording apparatus according to claim 3, further comprising:

reproducing means for performing audio decoding on a read signal read from said recording medium to produce a reproduced audio signal, wherein said predetermined signal form is a signal form which can be decoded in said audio decoding.

5. A recording apparatus according to claim 3, wherein said digital audio signal input to said digital audio input terminal is delayed by a predetermined time period, and the resulting delayed digital audio signal is multiplexed with said video signal.

6. A recording apparatus comprising:

recording means for analog-to-digital converting an analog audio signal input to an analog audio input terminal to a digital audio signal, and recording the digital audio signal on a recording medium;

a digital audio input terminal; and signal form determination means for determining whether or not a digital audio signal input to said digital audio input terminal has a predetermined signal form, wherein said recording means records said digital audio signal input to said digital audio input terminal on said recording medium instead of the digital audio signal converted from said analog audio signal, when said signal form determination means determines that said digital audio signal input to said digital audio input terminal has said predetermined signal form, and said recording means records said digital audio signal input to said digital audio input terminal together with the digital audio signal converted from said analog audio signal on said recording medium, when said signal form determination means determines that said digital audio signal input to said digital audio input terminal does not have said predetermined signal form.

* * * * *